United States Patent [19]

Kawakami

[11] Patent Number: 5,191,519
[45] Date of Patent: Mar. 2, 1993

[54] CURRENT SHARING CONTROL IN A PARALLEL INVERTER SYSTEM

[75] Inventor: Kazuto Kawakami, Fuchu, Japan
[73] Assignee: Kabushiki Kaisha Toshiba, Kawasaki, Japan
[21] Appl. No.: 858,064
[22] Filed: Mar. 26, 1992
[30] Foreign Application Priority Data Mar. 27, 1991 [JP] Japan .................................. 2-62318

[51] Int. Cl.⁵ ........................................... H02M 7/48
[52] U.S. Cl. ......................................... 363/71; 363/95
[58] Field of Search .................. 363/71, 95 X, 96, 97, 363/98

[56] References Cited

U.S. PATENT DOCUMENTS

| | | | |
|---|---|---|---|
| 4,677,535 | 6/1987 | Kawabata et al. | 363/71 |
| 4,947,310 | 8/1990 | Kawabata et al. | 363/71 |
| 4,969,079 | 11/1990 | Kiriyama et al. | 363/98 |
| 5,031,088 | 7/1991 | Tanaka | 363/96 |
| 5,057,989 | 10/1991 | Hirose et al. | 363/95 |
| 5,065,304 | 11/1991 | Tamai et al. | 363/97 |
| 5,121,315 | 6/1992 | Moriya | 363/98 |
| 5,130,617 | 7/1992 | Oshima et al. | 363/71 |

Primary Examiner—Steven L. Stephan
Assistant Examiner—Jeffrey Sterrett
Attorney, Agent, or Firm—Foley & Lardner

[57] ABSTRACT

This inverter system is directed to an inverter system in which a plurality of inverters adapted for generating output voltages corresponding to a voltage reference and a frequency reference respectively given through voltage controllers and frequency controllers are operated in parallel. In this inverter system, a difference between an output current of a corresponding inverter and output currents of other inverters is detected. By implementing the d-q axis orthogonal coordinate transform processing to that current difference, a first correction signal relating to the frequency of an output voltage of that inverter and a second correction signal relating to the amplitude of the output voltage thereof are provided.

13 Claims, 3 Drawing Sheets

CURRENT SHARING CONTROL IN A PARALLEL INVERTER SYSTEM

BACKGROUND OF THE INVENTION

1. Field of the Invention

This invention relates to an inverter system comprised of a plurality of inverters operated in parallel, and more particularly to an inverter system capable of keeping balance of sharing of load between respective inverters even in the case where a load undergoes a sudden change.

2. Prior Art

In the case where a required capacity cannot be ensured by a single inverter, or in the case where the reliability is required to be improved as a power supply system using inverter, there are many instances where a plurality of inverters may be operated in parallel. In this case, in order to allow an inverter system to have a capacity corresponding to the number of inverters operated in parallel, it is required to cause respective inverters to equally share the load.

Referring to FIG. 1, there is shown an example of the configuration of a conventional control system constituted with a view to keeping balance of sharing of load between inverters (see Japanese Patent Publication (JP-B}No. 46955/1983). This control system is directed to a control system adapted for operating in parallel two inverters $3a$ and $3b$. The first inverter $3a$ is included in a first inverter unit $1a$, and the second inverter $3b$ is included in a second inverter unit $1b$. Each of these inverter units $1a$ and $1b$ converts a d.c. power delivered from a d.c. power supply 2 to an a.c. power to deliver it to a load 20. It is to be noted that, in this specification, suffix a is attached to reference numerals indicating components belonging to the first inverter unit $1a$ and suffix b is attached to reference numerals indicating components belonging to the second inverter unit $1b$, thus to discriminate between respective components of the both inverter units. The d.c. power supply 2 may be comprised of an a.c. power supply and a rectifier, or may be comprised of a battery. Furthermore, such d.c. power supply 2 may employ the above-mentioned both power supply systems suitably in combination. In addition, d.c. power supplies may be separately on the inverters $1a$ and $1b$ sides, respectively. To the output terminals of the inverters $3a$ and $3b$, a.c. filters $4a$ and $4b$ for improvement of waveform are connected, respectively. There are many instances where a.c. filters of this kind are comprised of a reactor and a capacitor. However, in the case where transformers are respectively connected between the inverter $3a$ and the load 12, and between the inverter $3b$ and the load 12, impedance of each transformer itself may be substituted for discrete reactor.

Output currents Ia and Ib of the inverters $3a$ and $3b$ are detected by current detectors $11a$ and $11b$ on the output side of the a.c. filters $4a$ and $4b$, respectively. In the first inverter unit $1a$, a current difference $\Delta Ia = Ia - Ib$ is provided by a subtracter $12a$. Similarly, in the second inverter unit $1b$, a current difference $\Delta Ib = Ib - Ia$ is provided by a subtracter $12b$. A common output voltage V of the both inverter units $1a$ and $1b$ is detected by voltage detectors $13a$ and $13b$. On the basis of the voltage V and the current differences $\Delta Ia$ and $\Delta Ib$ detected in this way, an effective power detector $9a$ calculates an effective power difference $\Delta Pa = V \cdot \Delta Ia \cdot \cos\theta$, and an effective power detector $9b$ calculates an effective power difference $\Delta Pb = V \cdot \Delta Ib \cdot \cos\theta$. Furthermore, on the basis of the same detected values as above, a reactive power detector $10a$ calculates a reactive power difference $\Delta Qa = V \cdot \Delta Ia \cdot \sin\theta$, and a reactive power detector $10b$ calculates a reactive power difference $\Delta Qb = V \cdot \Delta Ib \cdot \sin\theta$. It is to be noted that $\theta$ is assumed to be a phase difference between a detected voltage and a detected current. The output of a synchronous control circuit comprised of a frequency reference oscillator (OSC) $7a$ and a synchronous controller (PLL) $8a$ is controlled on the basis of the effective power difference $\Delta Pa$. Similarly, the output of a synchronous control circuit comprised of a frequency reference oscillator (OSC) $7b$ and a synchronous controller (PLL) $8b$ is controlled on the basis of the effective power difference $\Delta Pb$. Each of the power differences $\Delta Pa$, $\Delta Pb$, $\Delta Qa$ and $\Delta Qb$ corresponds to a voltage signal converted by multiplying a conversion coefficient, in the corresponding power detector. The frequency reference oscillators $7a$ and $7b$ deliver a frequency reference for to the synchronous controllers $8a$ and $8b$. The synchronous controllers $8a$ and $8b$ generate frequency control signals for gate signal generators (PWM) $5a$ and $5b$ adapted for generating firing control pulses for PWM (Pulse Width Modulation) control, respectively. Furthermore, voltage controllers (VC) $6a$ and $6b$ basically serve to allow a voltage V detected by the voltage detectors $13a$ and $13b$ to be in correspondence with a voltage reference Vr. In this example, the voltage controllers $6a$ and $6b$ correct amplitudes of output voltages of the respective inverter units on the basis of reactive power differences $\Delta Qa$ and $\Delta Qb$ so that output currents Ia and Ib of the both inverters $3a$ and $3b$ are balanced to output control signals for voltage amplitudes to the gate signal generators $5a$ and $5b$, respectively. On the basis of the control signals delivered from the synchronous controllers $8a$ and $8b$ and the voltage controllers $6a$ and $6b$, the gate signal generators $5a$ and $5b$ control output voltages of the respective inverters $3a$ and $3b$.

In the inverter system of FIG. 1, control is carried out such that respective inverter units $1a$ and $1b$ equally share a power, i.e., a current to the load 20 on the basis of effective power difference $\Delta Pa$ and $\Delta Pb$ and reactive power differences $\Delta Qa$ and $\Delta Qb$. Each of the effective power detectors $9a$ and $9b$ adapted for detecting effective power differences $\Delta Pa$ and $\Delta Pb$ and the reactive power detectors $10a$ and $10b$ adapted for detecting reactive power differences $\Delta Qa$ and $\Delta Qb$ detects an average value of a power in place of an instantaneous value of a power. Namely, this control system is directed to a system adapted for controlling, on the basis of the above detection, an average value of a power instead of an instantaneous value of a power. For this reason, this control system not only requires a time for calculating an average value, but also includes a filter serving as a delay element in the power detection system. Accordingly, with this control system, delay in detection would be increased. For this reason, for example, in such cases where the load 20 suddenly changes, there was the possibility that there may transiently take place an unbalance in the load sharing of the respective inverter units la and lb, particularly in an extreme case, an inverter unit which has shared a more current may be brought into an overload state, leading to stop of operation.

SUMMARY OF THE INVENTION

An object of this invention is to provide an inverter system including a plurality of inverters connected in parallel wherein even in a transient state such as sudden change in load, the inverter system is adapted for equally keeping sharing of load of respective inverters, thus permitting those inverters to be operated in a more stabilized manner.

To achieve the above-mentioned object, in accordance with this invention, there is provided an inverter system including a plurality of inverters connected in parallel, each of the plurality of inverters comprising:

current detection means for detecting an output current of a corresponding inverter;

voltage control means for generating a voltage control signal corresponding to a difference between a voltage reference and an actual voltage of the corresponding inverter;

frequency control means for generating a frequency control signal corresponding to a difference between a frequency reference and an actual frequency of the corresponding inverter;

current difference formation means for forming a current difference signal relating to the corresponding inverter on the basis of a detected result by the current detection means;

d-q axis orthogonal coordinate transform means for transforming a current difference signal formed by the current difference formation means to a signal on the d-q axis orthogonal coordinate system, thus to form a first correction signal relating to the frequency of an output voltage of the corresponding inverter and a second correction signal relating to the amplitude of the output voltage thereof;

first correction means for correcting a frequency control signal by the first correction signal;

second correction means for correcting a voltage control signal by the second correction signal; and means for controlling the corresponding inverter in accordance with outputs from the first correction means and the second correction means.

DESCRIPTION OF THE PREFERRED EMBODIMENT

Figure 1:
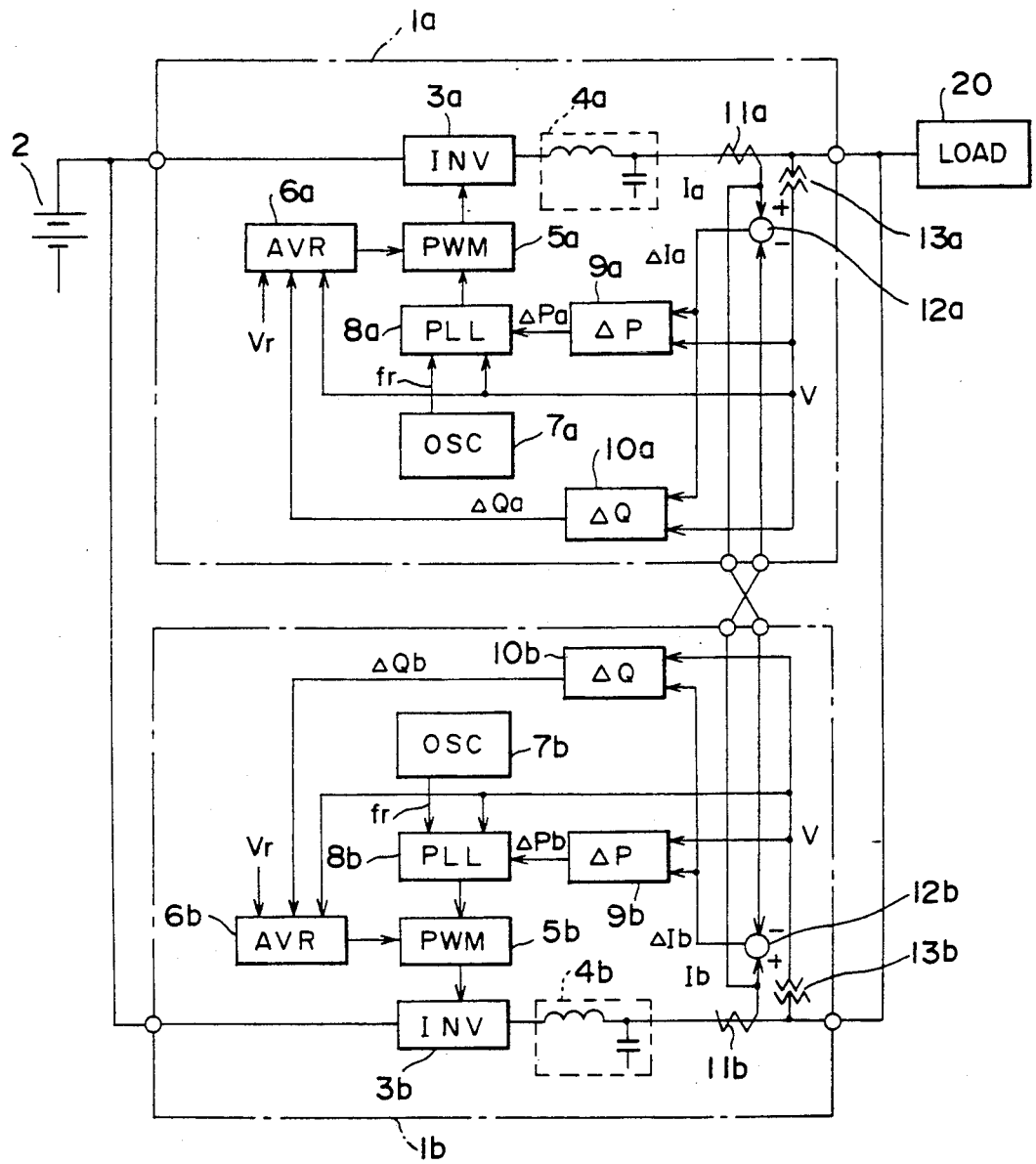
FIG. 1 is a block diagram showing a conventional control system.
Figure 2:
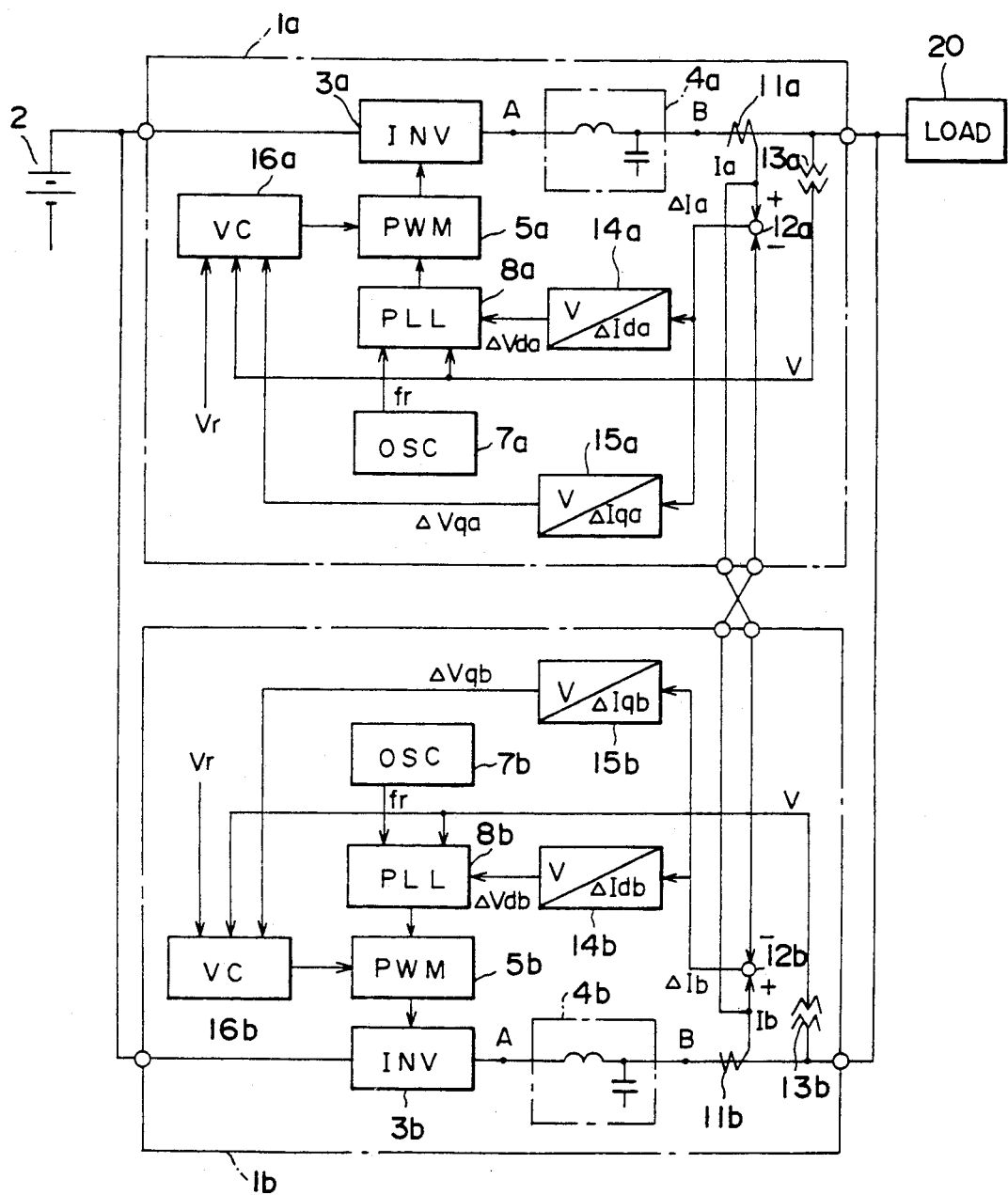
FIG. 2 is a block diagram showing an embodiment of a control system according to this invention.

In FIG. 2, elements are represented with the same reference numerals being respectively attached to the same elements as those of FIG. 1. In this embodiment, d-axis coordinate transform elements 14a and 14b are respectively provided in place of the power detectors 9a and 9b of FIG. 1, and q-axis coordinate transform elements 15a and 15b are respectively provided in place of the reactive power detectors 10a and 10b. Voltage Controllers (VC) 16a, 16b and synchronous controllers (PLL) 8a, 8b will be described later with reference to FIGS. 3 and 4. The d-axis coordinate transform elements 14a and 14b transform, on the real time basis, current differences $\Delta Ia$ and $\Delta Ib$ of the both inverter units to components $\Delta Ida$ and $\Delta Idb$ in a d-axis direction in the d-q coordinate system to further transform these components to first voltage correction signals $\Delta Vda$ and $\Delta Vdb$ by multiplying those components by transform coefficients to output them. Similarly, the q-axis coordinate transform elements 15a and 15b transform current differences $\Delta Ia$ and $\Delta Ib$ of the both inverter units to components $\Delta Iqa$ and $\Delta Iqb$ in a q-axis direction in the d-q coordinate system to transform these components to second voltage correction signals $\Delta Vqa$ and $\Delta Vqb$ by multiplying those components by transform coefficients to output them. It is to be noted that the detail of the d-q coordinate transform processing is disclosed in, e.g., B.K. Bose 'POWER ELECTRONICS AND AC DRIVES' Prentice-Hall Inc., 1986, §2.1.

The first voltage correction signals $\Delta Vda$ and $\Delta Vdb$ provided by the d-axis coordinate transform elements 14a and 14b are introduced to the synchronous controllers 8a and 8b as a frequency correction signal for allowing a difference between currents of the both inverter units 1a and 1b to become equal to zero. Each of synchronous controllers 8a and 8b is comprised of a Phase Locked Loop (PLL).

To the voltage controller 16a, voltage reference Vr, actual voltage signal V, and second voltage correction signal $\Delta Vqa$ are introduced. Similarly, to the voltage controller 16b, voltage reference Vr, actual voltage signal V, and second voltage correction signal $\Delta Vqb$ are introduced.

The d-axis coordinate transform elements 14a and 14b and the q-axis coordinate transform elements 15a and 15b serve to carry out, on the real time basis, the d-q coordinate transform processing of an instantaneous value of the current difference signal, and do not include any delay element. Accordingly, even in such a transient state where the load 20 suddenly changes, the control system can follow this at a sufficiently high speed. Thus, sharing of load between inverter units can be kept in a satisfactory balanced state at all times.

Figure 3A:
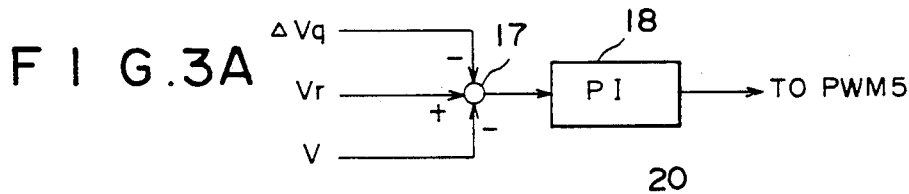
FIGS. 3A, 3B and 3C are block diagrams showing examples of different configurations of the voltage controller in the system of FIG. 2, and FIGS. 4A, 4B and 4C are block diagrams showing examples of different configurations of the synchronous controller in the system of FIG. 2.
Figure 3B:
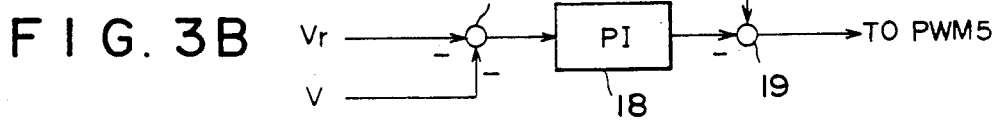
Figure 3C:
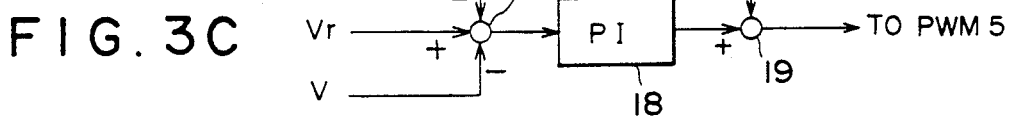

FIGS. 3A to 3C show the detail of the voltage controllers 16a and 16b. Basically, each of the voltage controllers of FIGS. 3A to 3C includes an adder 17 and a PI (Proportional Integral) action controller 18 connected on the output side thereof.

In the voltage controller of FIG. 3A, voltage reference Vr, actual voltage signal V detected by the voltage detectors 13a, 13b, and second correction signals $\Delta Vqa$, $\Delta Vqb$ (both are generically called a voltage correction signal $\Delta Vq$) outputted from the q-axis coordinate transform elements 15a and 15b are introduced to the adder 17. Namely, this voltage controller is characterized in that, in a well known PI action type voltage controller adapted to operate so as to allow a deviation $\Delta V$ (= Vf - V) between the voltage reference Vf and the actual voltage V to become close to zero, the above-mentioned deviation $\Delta V$ is further corrected by the voltage correction signal $\Delta Vq$. With this control circuit, the overall or synthetic current controllability is excellent because the voltage correction signal $\Delta Vq$ is processed by the main or major loop, but response in a error detector 21 compares information of a frequency included in the actual voltage signal V with the frequency reference for to output a deviation signal corresponding to that deviation. This deviation signal is corrected by the voltage correction signal ΔVd through the adder 22, and the deviation signal thus corrected is further delivered to the voltage controlled oscillator 24 through the low-pass filter 23. When the low-pass filter 23 is caused to be constituted with an operational amplifier, it can not only eliminate harmonic components, but also have a desired amplification characteristic, e.g., PI characteristic. The voltage controlled oscillator 24 forms a frequency signal proportional to an output of the low-pass filter 23 to deliver it to the gate signal generators (PWM) 5a and 5b.

Figure 4A:
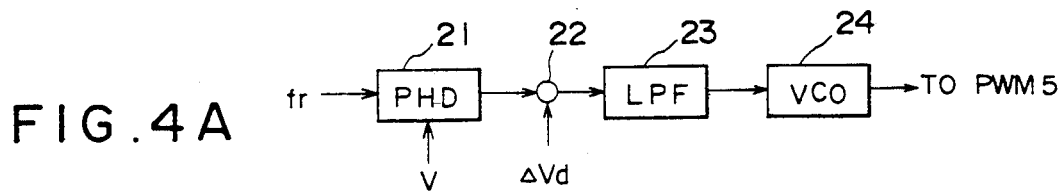

In the synchronous controller of FIG. 4A, since the first voltage correction signal ΔVd is processed through the low-pass filter 23, the response is not necessarily good. To eliminate this, it is desirable to employ a circuit configuration of FIG. 4B.

Figure 4B:
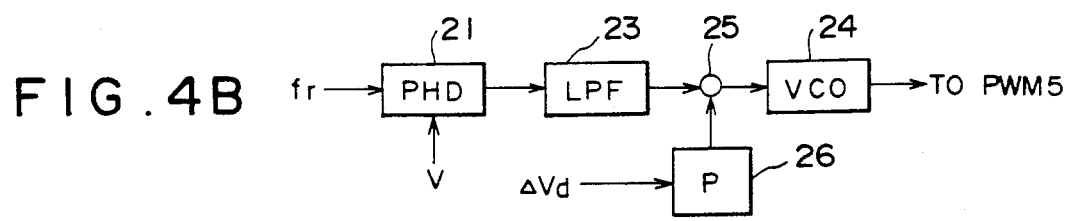

In the synchronous controller of FIG. 4B, an adder 25 is provided between the low-pass filter 23 and the voltage controlled oscillator 24. The corrective operation by the voltage correction signal ΔVd is carried out through a gain adjuster 26 and the adder 25. By employing such a configuration, the voltage correction signal ΔVd is processed without being passed through the low-pass filter 23, with the result that the drawback encountered with the case of FIG. 4A is eliminated. Thus, a desired response can be provided.

Figure 4C:
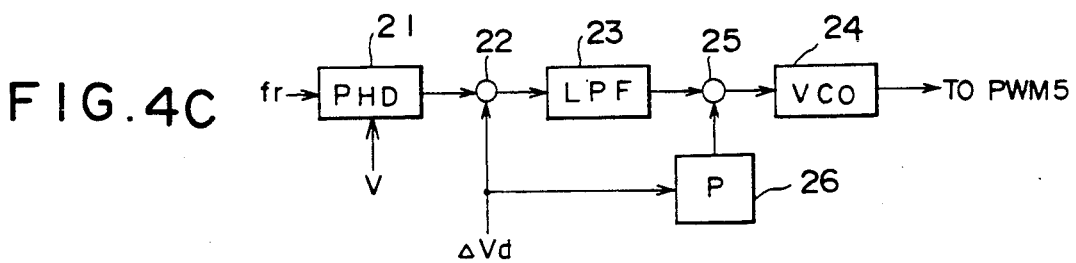

The feature of the synchronous controller of FIG. 4C resides in that the voltage correction signal ΔVd is introduced to both an adder 22 on the input side of the low-pass filter 23 and an adder 25 through a gain adjuster 26 on the output side thereof. The synchronous controller of FIG. 4C is characterized in that it commonly has the merit of the synchronous controller of current control is not so good because the voltage correction signal ΔVq is processed through the PI action controller 18.

Furthermore, in the voltage controller of FIG. 3B, voltage reference Vr and an actual voltage signal V are introduced to an adder 17. An adder 19 is provided on the output side of a controller 18, and a voltage correction signal ΔVq is inputted to the adder 19 through a gain adjuster 20. Also by this circuit, a control result similar to that of FIG. 3A can be provided. With this circuit, the overall current controllability is not necessarily good because the voltage correction signal ΔVq is processed by the minor loop, but the response in a current control is excellent because the voltage correction signal ΔVq is processed without being passed through the PI action controller 18.

In addition, the feature of the voltage controller of FIG. 3C resides in that the voltage correction signal ΔVq is introduced to both an adder 17 on the input side of the controller 18 and an adder 19 through a gain adjuster 20 on the output side thereof. The voltage controller of FIG. 3C is characterized in that it commonly has the merit of the voltage controller of FIG. 3A and the merit of the voltage controller of FIG. 3B. Namely, the voltage controller of FIG. 3C is excellent both in the overall current controllability and in the response in current control.

FIGS. 4A to 4C show the detail of the synchronous controllers (PLL) 8a, 8b, respectively. Basically, each of the synchronous controllers of FIGS. 4A to 4C includes a phase error detector (PHD) 21, a low-pass filter (LPF) 23, and a voltage controlled oscillator (VCO) 24.

In the synchronous controller of FIG. 4A, an adder 22 is inserted between the phase error detector 21 and the low-pass filter 23, and correction signals ΔVda and ΔVdb (both are generically called a voltage correction signal ΔVd) are introduced to the adder 22. The phase FIG. 4A and the merit of the synchronous controller of FIG. 4B. Namely, the synchronous controller of FIG. 4C is excellent both in the overall current controllability and in the response in current control.

The gate signal generators (PWM) 5a and 5b control the inverters 3a and 3b on the basis of frequency control signals from the synchronous controllers 8a and 8b and voltage control signals from the voltage controllers 5a and 5b.

While, in the system of FIG. 2, current difference signals ΔIa, ΔIb are provided by using equations expressed as ΔIa=Ia−Ib and ΔIb=Ib−Ia in correspondence with the fact that two inverter units 1a and 1b are provided, in the case where three inverter units or more are provided, it is sufficient to employ a difference ΔIi=Ii−Iav between a current Ii of a corresponding inverter unit and an average value Iav=(1/n)ΣIi (i=a∼n) of currents of all inverter units.

It is to be noted that, in the system of FIG. 2, output currents of the inverter units are detected by current detectors 11a and 11b disposed on the output side B of the a.c. filters 4a and 4b. For this reason, detected currents are given as currents obtained by subtracting current shunted into the capacitors of the a.c. filters 4a and 4b from output currents of the inverters 4a and 4b. Accordingly, in order to more accurately balance output currents of the inverters 4a and 4b, it is sufficient to dispose current detectors 11a and 11b on the input side A of the a.c. filters 4a and 4b (i.e., at the output terminals of the inverters 4a and 4b).

In the above-described embodiment, the d-axis coordinate transform elements 14a and 14b are used to determine components ΔIda and ΔIdb in the d-axis direction of the current differences ΔIa and ΔIb, and the q-axis coordinate transform elements 15a and 15b are used to determine the components ΔIqa and ΔIqb in the q-axis direction. However, there are instances where, in the d-q axis coordinate transform processing, in dependency upon the manner of setting the direction of an axis serving as reference, the components ΔIda and ΔIdb in the d-axis direction do not directly correspond to signals for correcting the phase and the frequency of the inverter output voltage, and the components ΔIqa and ΔIqb in the q-axis direction do not directly correspond to signals for correcting the amplitude of the inverter output voltage. In such a case, it is sufficient to provide desired correction signals by decomposition/synthesis of the component in the d-axis direction and the component in the q-axis direction.

The calculations at the respective components of the system of FIG. 2 may be carried out by a microprocessor.

What is claimed is:

1. An inverter system including a plurality of inverters connected in parallel,
   each of said plurality of inverters comprising:
   current detection means for detecting an output current of a corresponding inverter;
   voltage control means for generating a voltage control signal corresponding to a difference between a voltage reference and an actual voltage of said corresponding inverter;
   frequency control means adapted for generating a frequency control signal corresponding to a difference between a frequency reference and an actual frequency of said corresponding inverter;

current difference formation means for forming a current difference signal relating to said corresponding inverter on the basis of a detected result of said current detection means;

d-q axis orthogonal coordinate transform means for transforming a current difference signal formed by said current difference detection means to a signal on the d-q axis orthogonal coordinate system, thus to form a first correction signal relating to the frequency of an output voltage of said corresponding inverter and a second correction signal relating to the amplitude of said output voltage thereof;

first correction means for correcting said frequency control signal by said first correction signal;

second correction means for correcting said voltage control signal by said second correction signal; and means for controlling said corresponding inverter in accordance with outputs from said first correction means and said second correction means.

2. An inverter system as set forth in claim 1, wherein said frequency control means is comprised of a Phase Locked Loop.

3. An inverter system as set forth in claim 2, wherein said Phase Locked Loop is comprised of a phase error detector, a low-pass filter, and a voltage controlled oscillator.

4. An inverter system as set forth in claim 3, wherein said first correction signal is applied to the input terminal of said low-pass filter.

5. An inverter system as set forth in claim 3, wherein said first correction signal is applied to the input terminal of said voltage controlled oscillator.

6. An inverter system as set forth in claim 3, wherein said first correction signal is applied to both the input terminal of said low-pass filter and the input terminal of said voltage controlled oscillator.

7. An inverter system as set forth in claim 1, wherein said voltage control means is comprised of a PI action controller.

8. An inverter system as set forth in claim 7, wherein said second correction signal is applied to the input terminal of said PI action controller.

9. An inverter system as set forth in claim 7, wherein said second correction signal is applied to the output terminal of said PI action controller.

10. An inverter system as set forth in claim 7, wherein said second correction signal is applied to both the input terminal and the output terminal of said PI action controller.

11. An inverter system as set forth in claim 1, wherein said d-q axis orthogonal coordinate transform means is comprised of d-axis coordinate transform means and q-axis coordinate transform means, said d-axis coordinate transform means being operative to form, as its d-axis component, a first correction signal relating to the frequency of an output voltage of said inverter on the basis of said current difference signal, said q-axis coordinate transform means being operative to form, as its q-axis component, a second correction signal relating to the amplitude of an output voltage of said inverter on the basis of said current difference signal.

12. An inverter system as set forth in claim 1, wherein an a.c. filter is provided on the output side of each inverter, said current detection means being provided on the output side of said a.c. filter.

13. An inverter system as set forth in claim 1, wherein an a.c. filter is provided on the output side of each inverter, said current detection means being provided on the input side of said a.c. filter.

* * * * *